US009743441B2

(12) United States Patent
O Donnabhain

(10) Patent No.: US 9,743,441 B2
(45) Date of Patent: Aug. 22, 2017

(54) MOBILE DISCOVERY VIA COMMUNITY SELF-NAMING CONVENTIONS

(71) Applicant: Intel IP Corporation, Santa Clara, CA (US)

(72) Inventor: Donal O Donnabhain, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 115 days.

(21) Appl. No.: 14/751,547

(22) Filed: Jun. 26, 2015

(65) Prior Publication Data
US 2016/0381726 A1 Dec. 29, 2016

(51) Int. Cl.
H04W 76/02 (2009.01)
H04W 4/02 (2009.01)
H04W 12/06 (2009.01)
H04W 8/00 (2009.01)
H04W 48/16 (2009.01)
H04L 29/12 (2006.01)

(52) U.S. Cl.
CPC ......... H04W 76/023 (2013.01); H04W 4/025 (2013.01); H04W 8/00 (2013.01); H04W 12/06 (2013.01); H04L 61/2092 (2013.01); H04W 8/005 (2013.01); H04W 48/16 (2013.01)

(58) Field of Classification Search
None
See application file for complete search history.

(56) References Cited

U.S. PATENT DOCUMENTS

| 5,341,499 | A | * | 8/1994 | Doragh | H04L 29/06 707/E17.01 |
| 6,542,841 | B1 | * | 4/2003 | Snyder | H04B 10/0795 372/26 |
| 6,754,321 | B1 | * | 6/2004 | Innes | H04L 29/12009 379/100.15 |
| 2008/0315986 | A1 | * | 12/2008 | Johnson | H04N 5/445 340/3.71 |

* cited by examiner

Primary Examiner — Chi H Pham
Assistant Examiner — Shick Hom
(74) Attorney, Agent, or Firm — Jordan IP Law LLC

(57) ABSTRACT

Systems and methods may provide for determining a self-naming convention associated with a group of devices and receiving a first discovery communication from a remote mobile device. Additionally, a pairing process between the remote mobile device and a local mobile device may be accelerated if the first discovery communication is a remote device name that complies with the self-naming convention. In one example, a local device name may be generated in accordance with the self-naming convention and the local device name may be broadcasted as a second discovery communication.

20 Claims, 3 Drawing Sheets

FIG. 1
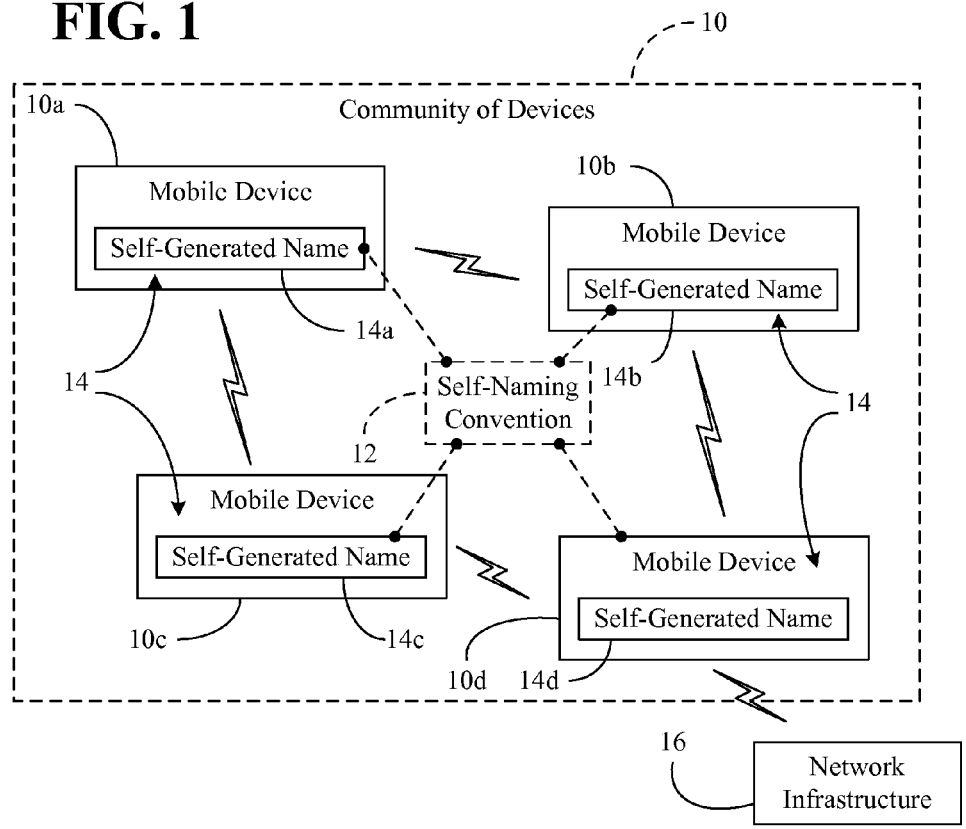
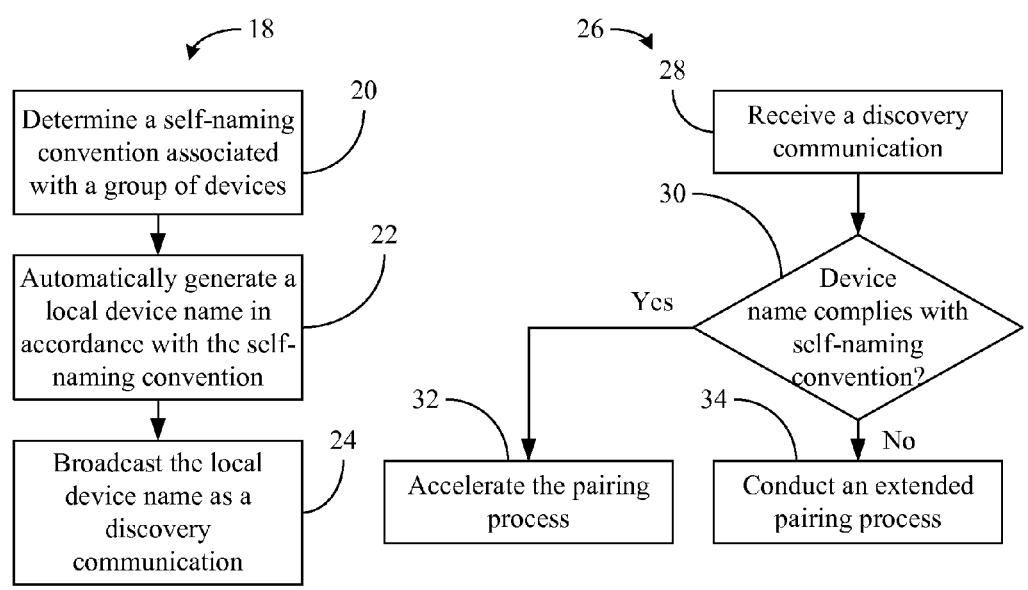
FIG. 2
FIG. 3

MOBILE DISCOVERY VIA COMMUNITY SELF-NAMING CONVENTIONS

TECHNICAL FIELD

Embodiments generally relate to mobile discovery. More particularly, embodiments relate to mobile discovery via community self-naming conventions.

BACKGROUND

A mobile device may be assigned an arbitrary device name during initial or subsequent set-up of the mobile device. In order to interact wirelessly with another nearby mobile device (e.g., via Bluetooth, Wi-Fi, etc.), a pairing/registration process may be conducted, wherein the results of the pairing/registration process may be used to facilitate future wireless connections between the devices. For example, a Bluetooth pairing process might include a discovery phase in which a "discoverable" device temporarily broadcasts the arbitrarily assigned name along with additional device data for capture and analysis by the nearby mobile device.

The pairing process may also include an authentication phase in which the two devices share information such as a personal identification number (PIN, e.g., in Bluetooth pairing) or service set identifier (SSID) code (e.g., in Wi-Fi registration) in order to verify the identity of the user(s) of the devices. Thus, successful completion of the authentication phase may enable the devices to "remember" one another so that future connections may be made without security concerns.

Such an approach, however, may negatively impact battery life during both the discovery and authentication phases due to increased power consumption associated with the wireless transmissions and computational overhead. Moreover, the authentication phase may be cumbersome, time consuming and lead to a negative user experience. While the user of the nearby mobile device may be permitted to select authorized devices based on their broadcasted device names as an alternative to PIN/SSID code based authentication, the user of the nearby mobile device may not recognize and/or trust the discoverable device based solely on the arbitrarily assigned name of the discoverable mobile device.

BRIEF DESCRIPTION OF THE DRAWINGS

The various advantages of the embodiments will become apparent to one skilled in the art by reading the following specification and appended claims, and by referencing the following drawings, in which:

FIG. 1 is a block diagram of an example of a community of devices according to an embodiment;

FIG. 2 is a flowchart of an example of a method of joining a community of devices according to an embodiment;

FIG. 3 is a flowchart of an example of a method of registering a remote mobile device according to an embodiment;

DESCRIPTION OF EMBODIMENTS

Figure 4A:
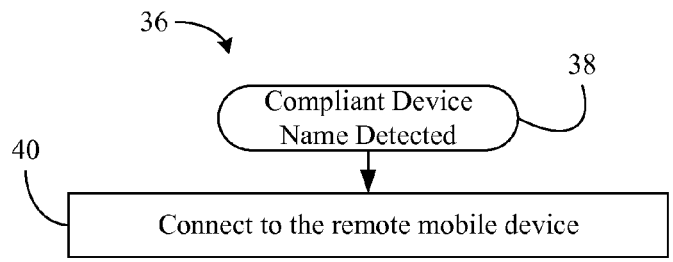
FIGS. 4A and 4B are flowcharts of examples of methods of conducting pairing processes according to embodiments.

Turning now to FIG. 1, a community of devices 10 (10a-10d) is shown in which mobile devices may be grouped together based on one or more common characteristics. Each of the mobile devices in the community of devices 10 may therefore be associated with users that are members of a common social network, activity, occupation, employer, educational institution, and so forth. For example, the mobile devices in the community of devices 10 may each be coupled to a bicycle, wherein the community is a group of cyclists. Wireless connections may be made between the mobile devices in the community of devices 10 for a variety of purposes such as, for example, messaging, media sharing, navigation assistance, etc.

The illustrated community of devices 10 has an associated self-naming convention 12, wherein the self-naming convention 12 may generally be used by the community of devices 10 to self-generate device names 14 (14a-14d). The self-naming convention 12 may generally be any rule, pattern or preset theme for naming the mobile devices in the community of devices 10. For example, the self-naming convention 12 might specify that a hash tag (#Tag) with a network SSID is to be prepended to the device name. In another example, the self-naming convention 12 may specify a certain seed value to be used in a pseudorandom number (PRN) generator that creates the device name. Other examples of the self-naming convention 12 may also be used. Thus, a first mobile device 10a may have a first self-generated device name 14a that complies with the self-naming convention 12, a second mobile device 10b may have a second self-generated device name 14b that complies with the self-naming convention 12, a third mobile device 10c may have a third self-generated device name 14c that complies with the self-naming convention 12, and a fourth mobile device 10d may have a fourth self-generated device name 14d that complies with the self-naming convention 12. The number of devices may vary depending on the circumstances. Additionally, the self-naming convention 12 may include an encryption component to ensure privacy as well as a distance limitation component that may be a function of the power delivered to the device.

As will be discussed in greater detail, the self-generated device names 14 may be used as discovery communications to accelerate pairings (e.g., registrations, introductions) between the mobile devices in the community of devices 10 so that wireless connections may be quickly made without concern over battery life, security or a negative user experience. Additionally, the self-naming convention 12 may enable the community of devices 10 to collaboratively achieve other functionality such as, for example, messaging, location determination/sharing, navigation, network management, etc., or any combination thereof. For example, the fourth mobile device 10d might determine its current geographic location via a connection with a network infrastructure (e.g., cellular network, wireless access point, global navigation satellite system/GNSS), and share that location information with the other mobile devices in the community of devices 10 (e.g., which might be indoors or otherwise without access to the location information). Indeed, information may also be sent from the community of devices 10 to the network infrastructure 16 for advanced functionality (e.g., navigation assistance), even though the network infrastructure 16 may include servers, etc., with device names that do not comply with the self-naming convention 12.

FIG. 2 shows a method 18 of joining a community of devices. The method 18 may generally be implemented in, for example, any of the mobile devices in the community of devices 10 (FIG. 1), already discussed. More particularly, the method 18 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 20 provides for determining a self-naming convention associated with a group (e.g., community) of devices. Block 20 might involve exchanging online communications with a server (e.g., in order to obtain a SSID hash tag, PRN generator, etc., as a member of the community). As already noted, the self-naming convention may include a rule, pattern or preset theme that instructs members of the group of devices how to name themselves. Block 22 may automatically generate a local device name in accordance with the self-naming convention. Thus, if the self-naming convention specifies, for example, that a hash tag with a particular network SSID (e.g., #bikenet) is to be prepended to the device name, block 22 might automatically add the hash tag to the beginning of an arbitrarily assigned device name (e.g., AmysTablet) to obtain the local device name (e.g., #bikenetAmysTablet). If, on the other hand, the self-naming convention specifies that a certain seed value is to be used in a PRN generator, block 22 may automatically feed the seed value to the PRN generator and substitute the PRN result for an arbitrarily assigned device name. Other approaches to automatically generating the local device name may be used depending on the parameters of the self-naming convention.

The local device name may be broadcast at block 24 as a discovery communication. Thus, block 24 may include continually transmitting the local device name via a wireless radio such as, for example, a Bluetooth and/or Wi-Fi radio. Of particular note is that the local device name may be the discovery communication in its entirety (e.g., no additional device data is transmitted along with the local device name). As a result, the impact on power consumption and/or battery life may be minimized.

FIG. 3 shows a method 26 of registering a remote mobile device with a local mobile device. The method 26 may generally be implemented in, for example, any of the mobile devices in the community of devices 10 (FIG. 1), already discussed. For example, the first mobile device 10a (FIG. 1, acting as the local mobile device) might use the method 26 when being introduced to the second mobile device 10b (FIG. 1, acting as the remote mobile device). More particularly, the method 26 may be implemented be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated block 28 provides for receiving a discovery communication, wherein a determination may be made at block 30 as to whether the discovery communication is (e.g., in its entirety) a remote device name that complies with a self-naming convention associated with a group of devices. Thus, block 30 might include, for example, analyzing a hash tag prepended to the remote device name, determining a seed value for a PRN value, and so forth. If it is determined at block 30 that the discovery communication is a remote device name that complies with the self-naming convention, illustrated block 32 accelerates the pairing (e.g., device registration and/or introduction) process. Otherwise, an extended pairing process may be conducted at block 34.

Turning now to FIG. 4A, a method 36 of accelerating a pairing process is shown. The method 36 may generally be implemented in, for example, any of the mobile devices in the community of devices 10 (FIG. 1), and may be readily substituted for block 32 (FIG. 3), already discussed. More particularly, the method 36 may be implemented be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 38 provides for detection of a compliant device name, wherein the local mobile device may be connected to the remote mobile device at block 40 (e.g., enabling messaging, media sharing, navigation assistance, etc., between the devices). Thus, compliance with the self-naming convention may enable certain assumptions to be made with regard to the trustworthiness of the remote mobile device so that the illustrated method 36 bypasses authentication activities.

Figure 4B:
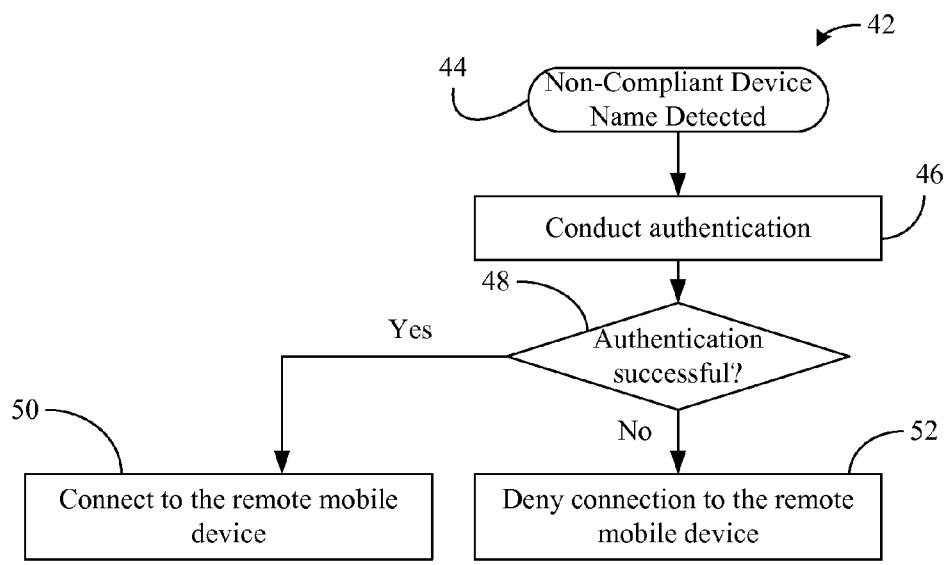

By contrast, FIG. 4B shows a method 42 of conducting an extended pairing process. The method 42 may generally be implemented in, for example, any of the mobile devices in the community of devices 10 (FIG. 1), and may be readily substituted for block 34 (FIG. 3), already discussed. More particularly, the method 42 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated block 44 provides for detection of a non-compliant device name, wherein one or more authentication activities may be conducted at block 46. Block 46 may include, for example, the exchange of information such as a PIN and/or SSID code in order to verify the identity of the user of the remote mobile device. If it is determined at block 48 that the authentication has been successful, illustrated block 50 connects the local mobile device to the remote mobile device 40. Otherwise, the connection to the remote mobile device may be denied at block 52.

Figure 5:
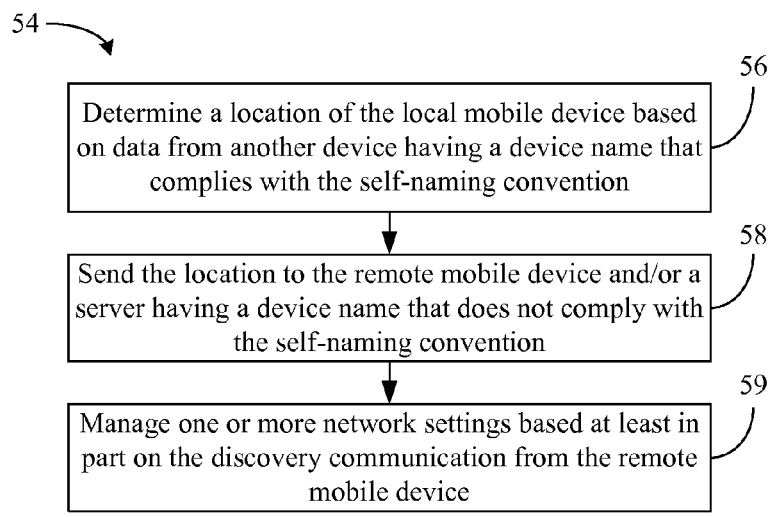
FIG. 5 is a flowchart of an example of a method of managing a community of devices according to an embodiment.

Turning now to FIG. 5, a method 54 of managing a community of devices is shown. The method 54 may generally be implemented in, for example, any of the mobile devices in the community of devices 10 (FIG. 1), already discussed. More particularly, the method 54 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 56 provides for determining a location of a local mobile device based on data from another device having a device name that complies with a self-naming convention as described herein. For example, with continued reference to FIGS. 1 and 5, processing block 56 might enable the third mobile device 10c (e.g., local mobile device) to determine (e.g., infer) its current location based on location information received wirelessly from the fourth mobile device 10d (e.g., another device), wherein the third mobile device 10c and the fourth mobile device 10d are near one another and the fourth self-generated device name 14d complies with the self-naming convention 12, as already discussed. Additionally, the location may be sent at block 58 to a remote mobile device and/or a server having a device name that does not comply with the self-naming convention. For example, with continued reference to FIGS. 1 and 5, processing block 58 might enable the third mobile device 10c (e.g., local mobile device) to send its current location to the first mobile device 10a (e.g., remote mobile device) and/or the network infrastructure 16 (e.g., server). In such a case, the first mobile device 10a may be able to determine/infer its current location based on the location received wirelessly from the third mobile device 10c and the server in the network infrastructure 16 may use the location information to provide advanced services such as navigation services to the community of devices 10.

Block 59 may manage one or more network settings based at least in part on the discovery communication from the remote mobile device. Block 59 may include, for example, dynamic spider network modeling/architecting and/or problem solving with regard to network bandwidth limitations (e.g., network handoff from cellular to Wi-Fi). Thus, with continued reference to FIGS. 1 and 5, if the connection of the fourth mobile device 10d to the network infrastructure 16 is an overloaded Wi-Fi connection, block 59 may switch the fourth mobile device 10d over to a cellular connection that may be used to support the community of devices 10. Other network management activities may also be conducted.

Figure 6:
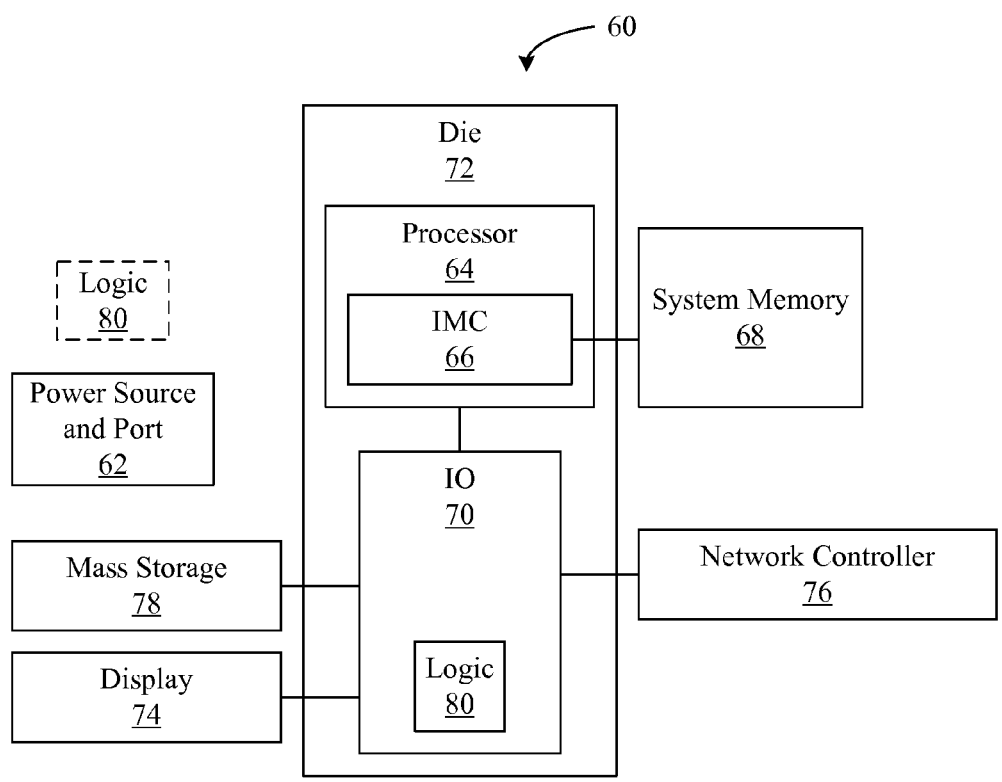
FIG. 6 is a block diagram of an example of a computing system according to an embodiment.

FIG. 6 shows a computing system 60. The computing system 60 may be part of an electronic device/platform having computing functionality (e.g., personal digital assistant/PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry), vehicular functionality (e.g., bicycle, car, truck, motorcycle), sensing functionality (e.g., Internet of Things/IoT device), etc., or any combination thereof. In the illustrated example, the system 60 includes a power source and port 62 to supply power to the system 60 and a processor 64 having an integrated memory controller (IMC) 66, which may communicate with system memory 68. The system memory 68 may include, for example, dynamic random access memory (DRAM) configured as one or more memory modules such as, for example, dual inline memory modules (DIMMs), small outline DIMMs (SODIMMs), etc.

The illustrated system 60 also includes an input output (IO) module 70 implemented together with the processor 64 on a semiconductor die 72 as a system on chip (SoC), wherein the IO module 70 functions as a host device and may communicate with, for example, a display 74 (e.g., touch screen, liquid crystal display/LCD, light emitting diode/LED display), a network controller 76 (e.g., Bluetooth radio, Wi-Fi radio), and mass storage 78 (e.g., hard disk drive/HDD, optical disk, flash memory, etc.). The illustrated IO module 70 may include logic 80 (e.g., implemented in logic instructions, configurable logic, fixed-functionality logic hardware, etc., or any combination thereof) that determines a self-naming convention associated with a group of devices, receives a first discovery communication from a remote mobile device, and accelerates a pairing process between the remote mobile device and the system 60 if the first discovery communication is a remote device name that complies with the self-naming convention. The display 74 may visually output the status of the pairing process.

Additionally, the logic 80 may generate a local device name in accordance with the self-naming convention and continually broadcast the local device name as a second discovery communication. Thus, the system 60 may be readily substituted for one or more of the mobile devices in the community of devices 10 (FIG. 1) and the logic 80 may perform one or more aspects of the method 18 (FIG. 2), the method 26 (FIG. 3), the method 36 (FIG. 4A), the method 42 (FIG. 4B), and/or the method 54 (FIG. 5), already discussed. Additionally, the semiconductor die 72 may function as a mobile discovery communication apparatus.

ADDITIONAL NOTES AND EXAMPLES

Example 1 may include a local mobile device comprising a battery port to receive power for the local mobile device, logic to determine a self-naming convention associated with a group of devices, receive a first discovery communication from a remote mobile device, and accelerate a pairing process between the remote mobile device and a local mobile device if the first discovery communication is a remote device name that complies with the self-naming convention, and a display to visually output a status of the pairing process.

Example 2 may include the local mobile device of Example 1, wherein the logic is to generate a local device name in accordance with the self-naming convention, and broadcast the local device name as a second discovery communication.

Example 3 may include the local mobile device of Example 1, wherein the logic is to bypass one or more authentication activities to accelerate the pairing process.

Example 4 may include the local mobile device of Example 3, wherein the logic is to conduct the one or more authentication activities if the first discovery communication is not a remote device name that complies with the self-naming convention.

Example 5 may include the local mobile device of any one of Examples 1 to 4, wherein the logic is to determine a location of the local mobile device based on data from another device having a device name that complies with the self-naming convention, and send the location to the remote mobile device.

Example 6 may include a mobile discovery communication apparatus comprising logic, implemented at least partly in one or more of configurable logic or fixed-functionality logic hardware, to determine a self-naming convention associated with a group of devices, receive a first discovery communication from a remote mobile device, and accelerate a pairing process between the remote mobile device and a local mobile device if the first discovery communication is a remote device name that complies with the self-naming convention.

Example 7 may include the apparatus of Example 6, wherein the logic is to generate a local device name in accordance with the self-naming convention, and broadcast the local device name as a second discovery communication.

Example 8 may include the apparatus of Example 6, wherein the logic is to bypass one or more authentication activities to accelerate the pairing process.

Example 9 may include the apparatus of Example 8, wherein the logic is to conduct the one or more authentication activities if the first discovery communication is not a remote device name that complies with the self-naming convention.

Example 10 may include the apparatus of any one of Examples 6 to 9, wherein the logic is to determine a location of the local mobile device based on data from another device having a device name that complies with the self-naming convention, and send the location to the remote mobile device.

Example 11 may include the apparatus of Example 10, wherein the logic is to send the location of the local mobile device to a server having a device name that does not comply with the self-naming convention.

Example 12 may include the apparatus of any one of Examples 6 to 9, wherein the logic is to manage one or more network settings based at least in part on the first discovery communication.

Example 13 may include a method of introducing remote mobile devices, comprising determining a self-naming convention associated with a group of devices, receiving a first discovery communication from a remote mobile device, and accelerating a pairing process between the remote mobile device and a local mobile device if the first discovery communication is a remote device name that complies with the self-naming convention.

Example 14 may include the method of claim 13, further including generating a local device name in accordance with the self-naming convention, and broadcasting the local device name as a second discovery communication.

Example 15 may include the method of claim 13, wherein accelerating the pairing process includes bypassing one or more authentication activities.

Example 16 may include the method of claim 15, further including conducting the one or more authentication activities if the first discovery communication is not a remote device name that complies with the self-naming convention.

Example 17 may include the method of any one of claims 13 to 16, further including determining a location of the local mobile device based on data from another device having a device name that complies with the self-naming convention, and sending the location to the remote mobile device.

Example 18 may include at least one non-transitory computer readable storage medium comprising a set of instructions, which when executed by a local mobile device, cause the local mobile device to determine a self-naming convention associated with a group of devices, receive a first discovery communication from a remote mobile device, and accelerate a pairing process between the remote mobile device and a local mobile device if the first discovery communication is a remote device name that complies with the self-naming convention.

Example 19 may include the at least one non-transitory computer readable storage medium of Example 18, wherein the instructions, when executed, cause the local mobile device to generate a local device name in accordance with the self-naming convention, and broadcast the local device name as a second discovery communication.

Example 20 may include the at least one non-transitory computer readable storage medium of Example 18, wherein the instructions, when executed, cause the local mobile device to bypass one or more authentication activities to accelerate the pairing process.

Example 21 may include the at least one non-transitory computer readable storage medium of Example 20, wherein the instructions, when executed, cause the local mobile device to conduct the one or more authentication activities if the first discovery communication is not a remote device name that complies with the self-naming convention.

Example 22 may include the at least one non-transitory computer readable storage medium of any one of Examples 18 to 21, wherein the instructions, when executed, cause the local mobile device to determine a location of the local mobile device based on data from another device having a device name that complies with the self-naming convention, and send the location to the remote mobile device.

Example 23 may include the at least one non-transitory computer readable storage medium of Example 22, wherein the instructions, when executed, cause the local mobile device to send the location of the local mobile device to a server having a device name that does not comply with the self-naming convention.

Example 24 may include the at least one non-transitory computer readable storage medium of any one of Examples 18 to 21, wherein the instructions, when executed, cause the local mobile device to manage one or more network settings based at least in part on the first discovery communication.

Example 25 may include a mobile discovery communication apparatus comprising means for determining a self-naming convention associated with a group of devices, means for receiving a first discovery communication from a remote mobile device, and means for accelerating a pairing process between the remote mobile device and a local mobile device if the first discovery communication is a remote device name that complies with the self-naming convention.

Example 26 may include the apparatus of Example 25, further including means for generating a local device name in accordance with the self-naming convention, and means for broadcasting the local device name as a second discovery communication.

Example 27 may include the apparatus of Example 25, wherein the means for accelerating the pairing process includes means for bypassing one or more authentication activities.

Example 28 may include the apparatus of Example 27, further including means for conducting the one or more authentication activities if the first discovery communication is not a remote device name that complies with the self-naming convention.

Example 29 may include the apparatus of any one of Examples 25 to 28, further including means for determining a location of the local mobile device based on data from another device having a device name that complies with the self-naming convention, and means for sending the location to the remote mobile device.

Example 30 may include the apparatus of Example 29, further including means for sending the location of the local mobile device to a server having a device name that does not comply with the self-naming convention.

Example 31 may include the apparatus of any one of Examples 25 to 28, further including means for managing one or more network settings based at least in part on the first discovery communication.

Techniques described herein may therefore set a standardized method of identifying devices. Wireless solutions may make use of SSID tags to enable the networks and/or devices to be identified and addressed. For example, a fixed #Tag naming at the start of an SSID tag may be used to identify membership in a group or community, as well as to accelerate data mining search processes. Based on the standardized naming convention, compliant devices may be used to drive location/navigation use cases. In addition, networks may significantly increase the number of discoverable devices as these devices may not necessarily connect to the network and use data bandwidth in the discoverable mode described herein. Moreover, a simple low power wireless solution with negligible computational overhead and minimal power consumption may render the techniques useful in the IoT and wearable domains (although equally applicable in the case of smart phones, tablets, laptops and other mobile platforms). Indeed, more capable solutions may have two SSID profiles—one profile for the classical data-intensive use case and another for discovery as a subset of the classical SSID profile.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A local mobile device comprising:
a battery port to receive power for the local mobile device;
logic to:
determine a self-naming convention associated with a group of devices,
receive a first discovery communication from a remote mobile device, and
accelerate a pairing process between the remote mobile device and the local mobile device by bypassing one or more authentication activities if the first discovery communication is a remote device name that complies with the self-naming convention; and
a display to visually output a status of the pairing process.

2. The local mobile device of claim 1, wherein the logic is to:
generate a local device name in accordance with the self-naming convention, and broadcast the local device name as a second discovery communication.

3. The local mobile device of claim 1, wherein the logic is to conduct the one or more authentication activities if the first discovery communication is not a remote device name that complies with the self-naming convention.

4. The local mobile device of claim 1, wherein the logic is to:
determine a location of the local mobile device based on data from another device having a device name that complies with the self-naming convention; and
send the location to the remote mobile device.

5. An apparatus comprising: a processor and;
logic, implemented at least partly in one or more of configurable logic or fixed-functionality logic hardware, to:
determine a self-naming convention associated with a group of devices,
receive a first discovery communication from a remote mobile device, and
accelerate a pairing process between the remote mobile device and a local mobile device by bypassing one or more authentication activities if the first discovery communication is a remote device name that complies with the self-naming convention.

6. The apparatus of claim 5, wherein the logic is to:
generate a local device name in accordance with the self-naming convention, and broadcast the local device name as a second discovery communication.

7. The apparatus of claim 5, wherein the logic is to conduct the one or more authentication activities if the first discovery communication is not a remote device name that complies with the self-naming convention.

8. The apparatus of claim 5, wherein the logic is to:
determine a location of the local mobile device based on data from another device having a device name that complies with the self-naming convention, and
send the location to the remote mobile device.

9. The apparatus of claim 8, wherein the logic is to send the location of the local mobile device to a server having a device name that does not comply with the self-naming convention.

10. The apparatus of claim 5, wherein the logic is to manage one or more network settings based at least in part on the first discovery communication.

11. A method comprising:
determining a self-naming convention associated with a group of devices;

receiving a first discovery communication from a remote mobile device; and accelerating a pairing process between the remote mobile device and a local mobile device by bypassing one or more authentication activities if the first discovery communication is a remote device name that complies with the self-naming convention.

12. The method of claim 11, further including:

generating a local device name in accordance with the self-naming convention; and broadcasting the local device name as a second discovery communication.

13. The method of claim 11, further including conducting the one or more authentication activities if the first discovery communication is not a remote device name that complies with the self-naming convention.

14. The method of claim 11, further including:

determining a location of the local mobile device based on data from another device having a device name that complies with the self-naming convention; and sending the location to the remote mobile device.

15. At least one non-transitory computer readable storage medium comprising a set of instructions, which when executed by a local mobile device, cause the local mobile device to:

determine a self-naming convention associated with a group of devices;

receive a fast discovery communication from a remote mobile device; and accelerate a pairing process between the remote mobile device and a local mobile device by bypassing one or more authentication activities if the first discovery communication is a remote device name that complies with the self-naming convention.

16. The at least one non-transitory computer readable storage medium of claim 15, wherein the instructions, when executed, cause the local mobile device to:

generate a local device name in accordance with the self-naming convention; and broadcast the local device name as a second discovery communication.

17. The at least one non-transitory computer readable storage medium of claim 15, wherein the instructions, when executed, cause the local mobile device to conduct the one or more authentication activities if the first discovery communication is not a remote device name that complies with the self-naming convention.

18. The at least one non-transitory computer readable storage medium of claim 15, wherein the instructions, when executed, cause the local mobile device to:

determine a location of the local mobile device based on data from another device having a device name that complies with the self-naming convention; and send the location to the remote mobile device.

19. The at least one non-transitory computer readable storage medium of claim 18, wherein the instructions, when executed, cause the local mobile device to send the location of the local mobile device to a server having a device name that does not comply with the self-naming convention.

20. The at least one non-transitory computer readable storage medium of claim 15, wherein the instructions, when executed, cause the local mobile device to manage one or more network settings based at least in part on the first discovery communication.

* * * * *